(12) United States Patent
Park et al.

(10) Patent No.: US 10,349,446 B2
(45) Date of Patent: Jul. 9, 2019

(54) CHANNEL SENSING IN WIRELESS COMMUNICATION SYSTEM, TRANSMISSION METHOD BASED ON SAME, AND DEVICE THEREFOR

(71) Applicant: LG ELECTRONICS INC., Seoul (KR)

(72) Inventors: Hanjun Park, Seoul (KR); Joonkui Ahn, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/574,278

(22) PCT Filed: May 23, 2016

(86) PCT No.: PCT/KR2016/005416
§ 371 (c)(1),
(2) Date: Nov. 15, 2017

(87) PCT Pub. No.: WO2016/190631
PCT Pub. Date: Dec. 1, 2016

(65) Prior Publication Data
US 2018/0139781 A1    May 17, 2018

Related U.S. Application Data

(60) Provisional application No. 62/165,217, filed on May 22, 2015.

(51) Int. Cl.
*H04W 74/08* (2009.01)
*H04W 72/12* (2009.01)
(Continued)

(52) U.S. Cl.
CPC ....... *H04W 74/0808* (2013.01); *H04W 72/14* (2013.01); *H04W 16/14* (2013.01); *H04W 72/1268* (2013.01)

(58) Field of Classification Search
CPC . H04W 16/14; H04W 72/12; H04W 72/1268; H04W 72/14; H04W 74/00; H04W 74/08; H04W 74/0808
See application file for complete search history.

(56) References Cited

U.S. PATENT DOCUMENTS 10,057,785 B2* 8/2018 Kwak ............... H04L 27/26
2007/0076742 A1* 4/2007 Du .................... H04L 47/14
370/445
(Continued)

FOREIGN PATENT DOCUMENTS

| KR | 10-2010-0086423 A | 7/2010 |
| KR | 10-1452387 B1 | 10/2014 |
| WO | WO 2014/200951 A2 | 12/2014 |

*Primary Examiner* — Tri H Phan
(74) *Attorney, Agent, or Firm* — Birch, Stewart, Kolasch & Birch, LLP

(57) ABSTRACT

According to one embodiment, the present invention relates to channel sensing in an unlicensed band in a wireless communication system, and a data transmission method based on the same, wherein the method is performed by a transmission node for transmitting data by performing the channel sensing and comprises the steps of: receiving a data transmission instruction from a control node; performing a channel sensing-related operation in at least one of channel sensing-related operation execution sections set prior to each of a plurality of transmission opportunity units allowed at the transmission node, according to the data transmission instruction; and transmitting data according to the data transmission instruction in the transmission opportunity unit corresponding to a specific channel sensing-related operation execution section, if it is determined that a channel for
(Continued)

transmitting the data is in the unoccupied state in the specific channel sensing-related operation execution section, wherein a transmission priority is assigned to each of the plurality of transmission opportunity units, and the length of the channel sensing-related opportunity execution section set prior to each of the plurality of transmission opportunity units can be adjusted according to the transmission priority assigned to each transmission opportunity unit.

10 Claims, 10 Drawing Sheets

(51) Int. Cl.
*H04W 72/14* (2009.01)
*H04W 16/14* (2009.01)

(56) References Cited

U.S. PATENT DOCUMENTS

| | | |
|---|---|---|
| 2015/0092758 A1 | 4/2015 | Chen et al. |
| 2015/0103777 A1 | 4/2015 | Chen et al. |
| 2016/0099794 A1* | 4/2016 | Chendamarai Kannan ................ H04B 17/345 370/329 |
| 2016/0278088 A1* | 9/2016 | Cheng .................... H04L 47/27 |
| 2017/0142743 A1* | 5/2017 | Yoon .................... H04L 5/0048 |
| 2017/0202043 A1* | 7/2017 | Seo ........................ H04W 4/70 |
| 2017/0339720 A1* | 11/2017 | Kim ..................... H04W 16/14 |
| 2018/0184459 A1* | 6/2018 | Kim .......................... H04L 5/00 |
| 2018/0213566 A1* | 7/2018 | Baron ............... H04W 72/1242 |

* cited by examiner (a)

(b)

CHANNEL SENSING IN WIRELESS COMMUNICATION SYSTEM, TRANSMISSION METHOD BASED ON SAME, AND DEVICE THEREFOR

CROSS REFERENCE TO RELATED APPLICATIONS

This application is the National Phase of PCT International Application No. PCT/KR2016/005416, filed on May 23, 2016, which claims priority under 35 U.S.C. 119(e) to U.S. Provisional Application No. 62/165,217, filed on May 22, 2015, all of which are hereby expressly incorporated by reference into the present application.

TECHNICAL FIELD

The present invention relates to a wireless communication system, and more particularly, to a method of performing channel sensing in an unlicensed band and an apparatus therefor.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station (s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE OF THE INVENTION

Technical Task

A technical task of the present invention is to propose a method of performing channel sensing in an unlicensed band and a method of performing transmission according to the channel sensing.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of performing channel sensing and data transmission according to the channel sensing, which is performed by a transmitting node in an unlicensed band in a wireless communication system, includes the steps of receiving a data transmission indication from a control node, performing a channel sensing-related operation in at least one of channel sensing-related operation execution sections set prior to each of a plurality of transmission opportunity units allowed to the transmitting node according to the data transmission indication, and if a state of a channel on which the data is to be transmitted is determined as an unoccupied state in a specific channel sensing-related operation execution section, performing a data transmission according to the data transmission indication in a transmission opportunity unit corresponding to the specific channel sensing-related operation execution section. In this case, a transmission priority may be assigned to each of the plurality of the transmission opportunity units and the channel sensing-related operation execution sections set prior to each of a plurality of transmission opportunity units may has a length being adjusted according to the transmission priority assigned to each of a plurality of the transmission opportunity units.

Additionally or alternatively, a length of a channel sensing-related operation execution section of a preceding transmission opportunity unit among the plurality of the transmission opportunity units may be longer than a length of a channel sensing-related operation execution section of a following transmission opportunity unit.

Additionally or alternatively, the performing the channel sensing-related operation in the channel sensing-related operation execution sections set prior to each of a plurality of transmission opportunity units may further include adding an offset, which is determined according to a priority of a corresponding transmission opportunity unit, to a value of a back-off counter for the transmitting node.

Additionally or alternatively, the method may further include initializing the value of the back-off counter for the transmitting node with a predetermined value when the priority of the transmission opportunity unit corresponds to a predetermined value.

Additionally or alternatively, the channel sensing-related operation can include at least one of an operation of performing back-off counter-based initial clear channel assessment (CCA), an operation of performing back-off counter-based extended CCA (ECCA), an operation of deferring transmission, or an operation of transmitting a reservation signal.

Additionally or alternatively, the method may further include transmitting a reservation signal when a back-off counter value becomes 0 in a channel sensing-related operation execution section set prior to one of a plurality of the transmission opportunity units. In this case, the reservation signal may include information indicating a transmission opportunity unit and among a plurality of the transmission opportunity units and that the reservation signal may be for a data transmission for the indicated transmission opportunity unit.

To further achieve these and other advantages and in accordance with the purpose of the present invention, according to a different embodiment, a transmitting node configured to perform channel sensing and data transmission according to the channel sensing in an unlicensed band in a wireless communication system includes a radio frequency (RF) unit and a processor that controls the RF unit, the processor controls the RF unit to receive a data transmission indication from a control node, performs a channel sensing-related operation in at least one of channel sensing-related operation execution sections set prior to each of a plurality of transmission opportunity units allowed to the transmitting node according to the data transmission indication, when a state of a channel on which the data is to be transmitted is determined as an unoccupied state in a specific channel sensing-related operation execution section, and performs a data transmission according to the data transmission indication in a transmission opportunity unit corresponding to the specific channel sensing-related operation execution section. In this case, a transmission priority may be assigned to each of a plurality of the transmission opportunity units and the channel sensing-related operation execution sections set prior to each of a plurality of transmission opportunity units may has a length being adjusted according to the transmission priority assigned to each of a plurality of the transmission opportunity units.

Additionally or alternatively, a length of a channel sensing-related operation execution section of a preceding transmission opportunity unit among the plurality of the transmission opportunity units may be longer than a length of a channel sensing-related operation execution section of a following transmission opportunity unit.

Additionally or alternatively, the processor may add an offset, which is determined according to a priority of a corresponding transmission opportunity unit, to a value of a back-off counter for the transmitting node to perform the channel sensing-related operation in the channel sensing-related operation execution sections set prior to each of the plurality of transmission opportunity units.

Additionally or alternatively, the processor may initialize the value of the back-off counter for the transmitting node with a predetermined value when the priority of the transmission opportunity unit corresponds to a predetermined value.

Additionally or alternatively, the channel sensing-related operation may include at least one of an operation of performing back-off counter-based initial clear channel assessment (CCA), an operation of performing back-off counter-based extended CCA (ECCA), an operation of deferring transmission, or an operation of transmitting a reservation signal.

Additionally or alternatively, the processor may control the RF unit to transmit a reservation signal when a back-off counter value becomes 0 in a channel sensing-related operation execution section set prior to one of the plurality of the transmission opportunity units, and the reservation signal may include information indicating a transmission opportunity unit among the plurality of the transmission opportunity units and that the reservation signal may be for a data transmission for the indicated transmission opportunity unit.

Technical solutions obtainable from the present invention are non-limited the above-mentioned technical solutions. And, other unmentioned technical solutions can be clearly understood from the following description by those having ordinary skill in the technical field to which the present invention pertains.

Advantageous Effects

According to one embodiment of the present invention, it is able to efficiently perform channel sensing and transmission in an unlicensed band.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
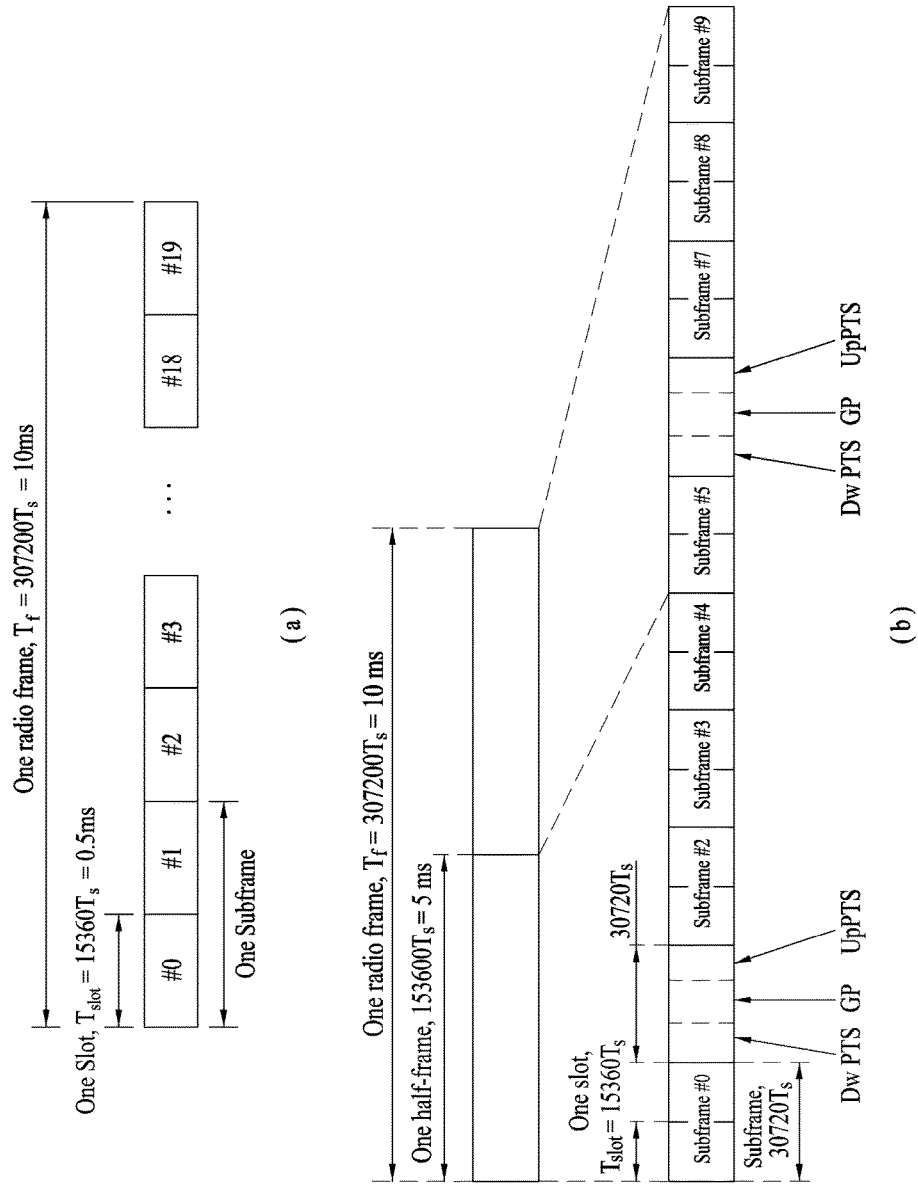
FIG. 1 is a diagram for an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlike a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CST-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/ downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

|  | Normal cyclic prefix in downlink | | | Extended cyclic prefix in downlink | | |
| --- | --- | --- | --- | --- | --- | --- |
|  |  | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
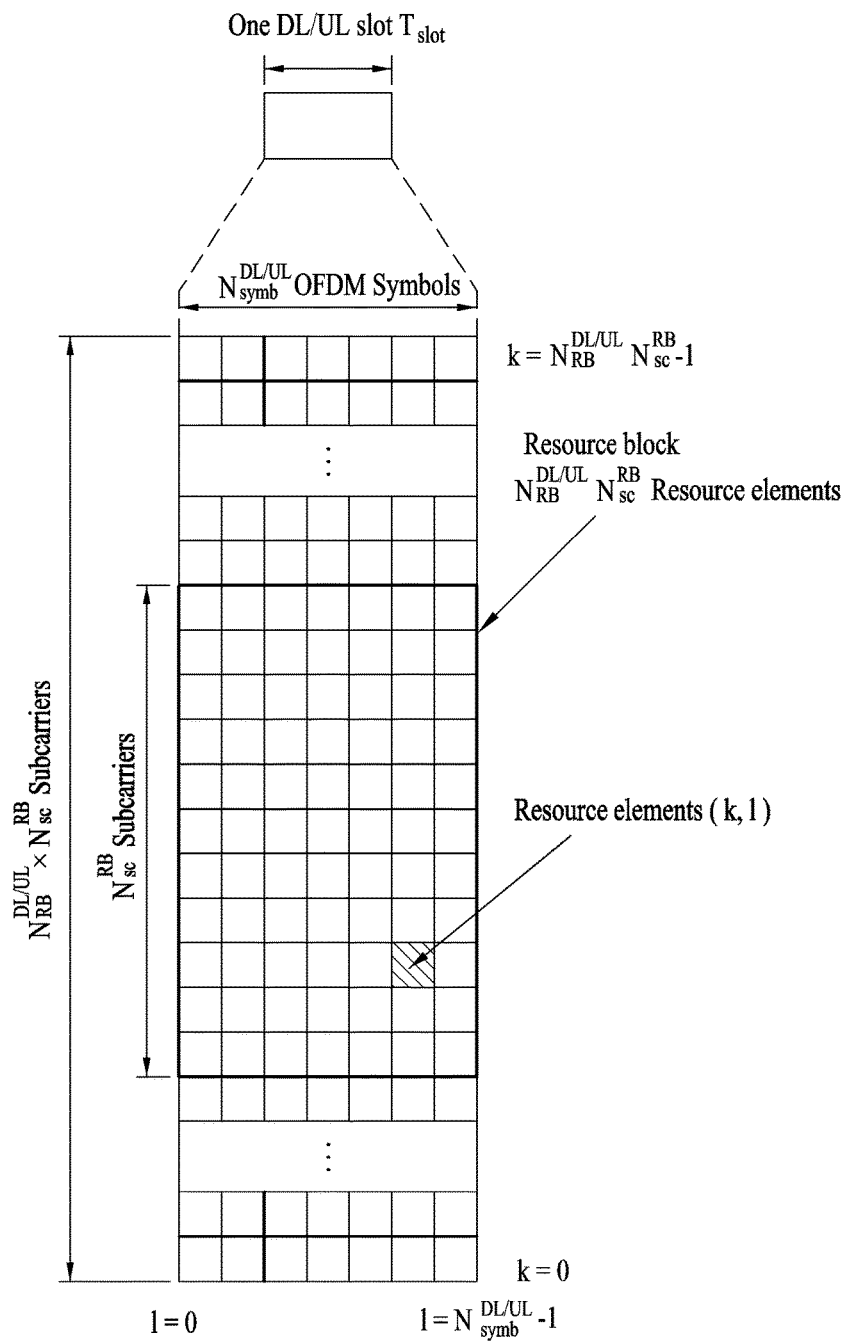
FIG. 2 is a diagram for an example of a downlink (DL)/uplink (UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL}*N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL}*N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (M) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL}*N_{sc}^{RB}$ REs.

Each RE in a resource grid can be uniquely defined by an index pair (k, 1) in a slot. Here, k is an index in the range of $N_{symb}^{DL/UL}*N_{sc}^{RB}-1$ in the frequency domain and 1 is an index in the range of 0 to $N_{symb}^{DL/UL}-1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL}-1$, and $N_{VRB}^{DL}=N_{RB}^{DL}$ obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
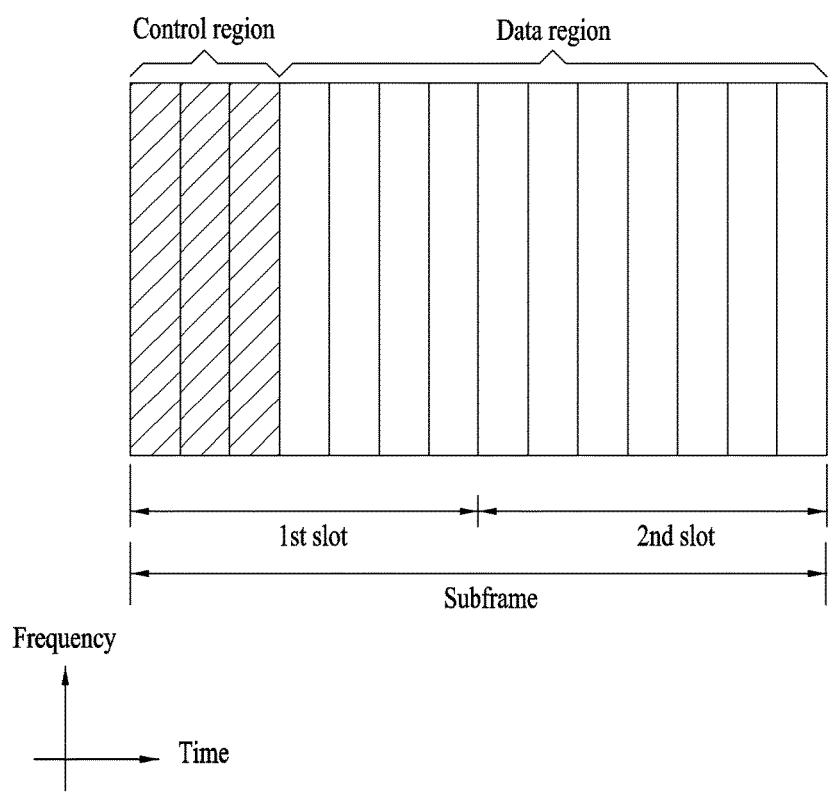
FIG. 3 is a diagram for an example of a downlink (DL) subframe structure used in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAT), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Type | Search Space Aggregation Level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
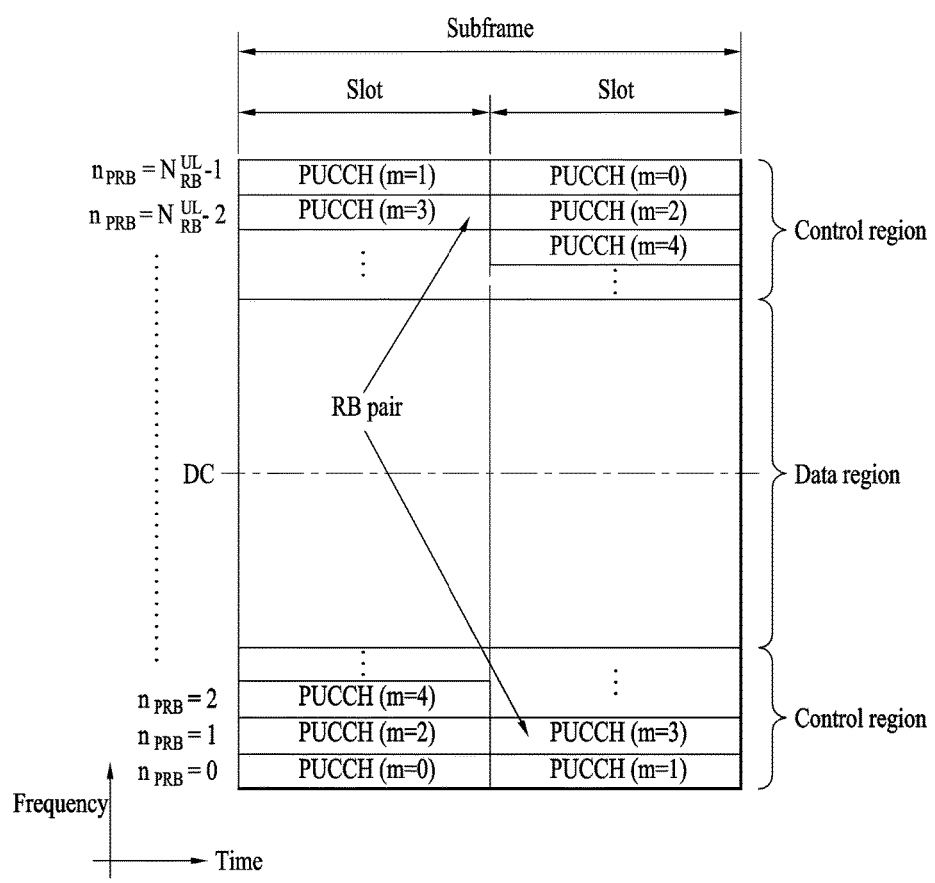
FIG. 4 is a diagram for an example of an uplink (UL) subframe structure used in 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

Recently, with the advent of a smart device, data traffic is considerably increasing. As a result, a next generation wireless communication system such as 3GPP LTE-A is trying to find ways to efficiently utilizing a limited frequency band. In particular, the next generation wireless communication system considers managing a cellular network on such an unlicensed band as 2.4 GHz or 5 GHz.

Since an unlicensed band basically assumes a scheme of having wireless transmission and reception opportunity via contention between communication nodes, it is required for each communication node to perform such a work as channel sensing before a signal is transmitted to check whether or not a signal is transmitted by a different communication node. For clarity, the above-mentioned operation is referred to as LBT (listen before talk). In particular, the operation of checking whether or not a different node transmits a signal is defined as CS (carrier sensing) or CCA (clear channel assessment). If it is determined as a different transmitting node does not transmit a signal based on a result of the CCA, it is defined as a channel unoccupied state. Otherwise, it is defined as a channel occupied state. In LTE system, it is necessary for an eNB or a UE to perform the LBT to transmit a signal on an unlicensed band. When the eNB or the UE transmits a signal in the LTE system, it is necessary for other communication nodes such as Wi-Fi to perform the LBT not to cause any interference. For example, a CCA threshold is regulated by −62 dBm for a non-WiFi signal and −82 dBm for a WiFi signal, respectively, in WiFi standard (e.g., 802.11ac). For example, if a signal other than WiFi signal is received with power equal to or greater than −62 dBm, an STA or an AP does not transmit a signal in order not to cause any interference.

Figure 5:
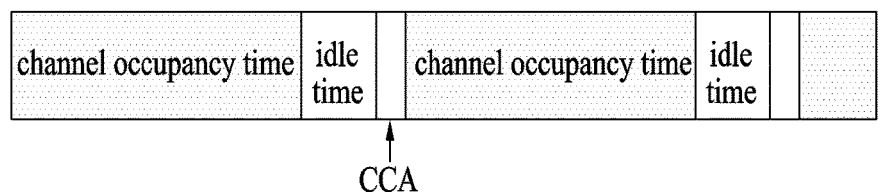
FIG. 5 is a diagram for an example of an LBT (listen before talk)-based channel access operation according to a FBE (frame based equipment)

For example, regulation of Europe illustrates two types of LBT-based channel access operation respectively referred to as FBE (frame based equipment) and LBE (load based equipment). The FBE configures a single frame using channel occupancy time (e.g., 1-10 ms) corresponding to time capable of maintaining transmission when a communication node succeeds in accessing a channel and idle time corresponding to the minimum 5% of the channel occupancy time. The CCA is defined as an operation of observing a channel for at least 20 μs of the last part of the idle time. In this case, a communication node periodically performs the CCA in a unit of the frame. If a channel is unoccupied, the communication node transmits data during the channel occupancy time. If a channel is occupied, the communication node waits until a CCA slot of a next period while postponing transmission. FIG. 5 shows an example of the FBE operation.

Figure 6:
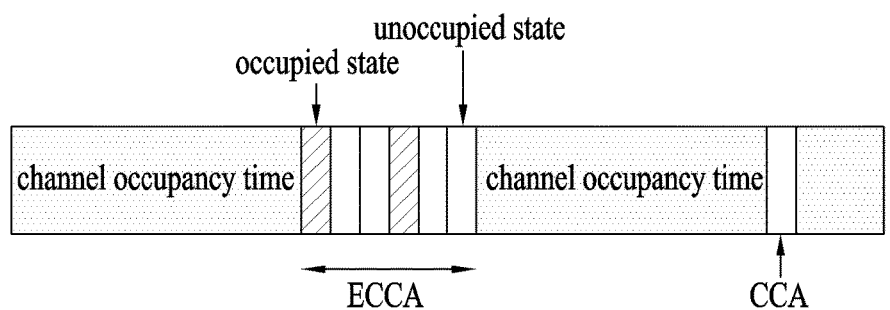
FIG. 6 is a diagram for an example of an LBT (listen before talk)-based channel access operation according to an LBE (load based equipment)

Meanwhile, in case of the LBE, a communication node configures a value of $q \in \& \{4, 5, \ldots, 32\}$ first and performs CCA on a single slot. If a channel is unoccupied in the initial CCA slot, the communication node can transmit data by securing channel occupancy time as much as a length of $(13/32)q$ ms. If a channel is occupied in the initial CCA slot, the communication node randomly selects a value of $N \in \{1, 2, \ldots, q\}$, stores the selected value as an initial value of a counter, and senses a channel state in a unit of a CCA slot. If a channel is unoccupied in a specific CCA slot, the communication node reduces the value stored in the counter by 1. If the value stored in the counter becomes 0, a user equipment (UE) can transmit data with channel occupancy time as much as a length of $(13/32)q$ ms. FIG. 6 shows an example of the LBE operation.

In the example, an occupied state of a channel or an unoccupied state of the channel can be determined based on whether or not reception power exceeds a prescribed threshold in a CCA slot. For example, according to the Wi-Fi standard (e.g., 801.11ac), a CCA threshold is regulated by −62 dBm and −82 dBm for a non-Wi-Fi signal and a Wi-Fi signal, respectively. In particular, if a signal rather than a Wi-Fi signal is received with power equal to or greater than −62 dBm, an STA (station) or an AP (access point) does not perform signal transmission to avoid interference occurrence.

Meanwhile, a wireless communication system such as 3GPP LTE-A, and the like, considers a method of combining a cell operating on a licensed band (hereinafter, L-cell) and a cell operating on an unlicensed band (hereinafter, U-cell) with each other using a CA (carrier aggregation) technique and an LAA (licensed assisted access) system performing LBT-based DL/UL transmission in the U-cell. When a heterogeneous system such as Wi-Fi and the like capable of being managed in an unlicensed band is considered, it is preferable to have an LBT operation capable of supporting a back-off operation (i.e., an operation of performing ECCA until a back-off counter becomes 0) and easily securing a channel at relatively random timing. For example, an LBE operation of the Europe regulation also supports an (incremental) back-off operation. Hence, the LBE operation can be considered as the LBT operation for the LAA system.

The LAA system inherits DL and UL structures from an LTE system. In particular, a DL transmitting node corresponds to a base station for a single U-cell in the aspect of the U-cell and a UL transmitting node may correspond to a terminal capable of performing UL transmission to the U-cell. In this case, since the base station corresponding to the DL transmitting node corresponds to a main entity of DL scheduling in DL, if the base station performs an LBT operation and knows that a channel is in an unoccupied state at random timing after CCA is performed, the base station is able to transmit DL data together with DCI (downlink control information) at the random timing or timing adjacent to the random timing. On the contrary, in case of UL, the user equipment corresponding to the UL transmitting node is unable to autonomously perform UL scheduling. The user equipment can transmit UL data at the timing promised with the base station in advance only after a UL grant corresponding to UL scheduling indication of the base station is received from the base station. Hence, although the user equipment determines that a channel is in an unoccupied state at specific timing via an LBT operation, if the user equipment fails to receive the UL grant indicating UL transmission at the specific timing from the base station, the user equipment is unable to perform UL transmission. Similarly, although the base station indicates UL transmission to be performed at the specific timing via the UL grant, if the user equipment performs LBT at the specific timing and determines that a channel is in an occupied state, the user equipment is unable to perform UL transmission.

Figure 7:
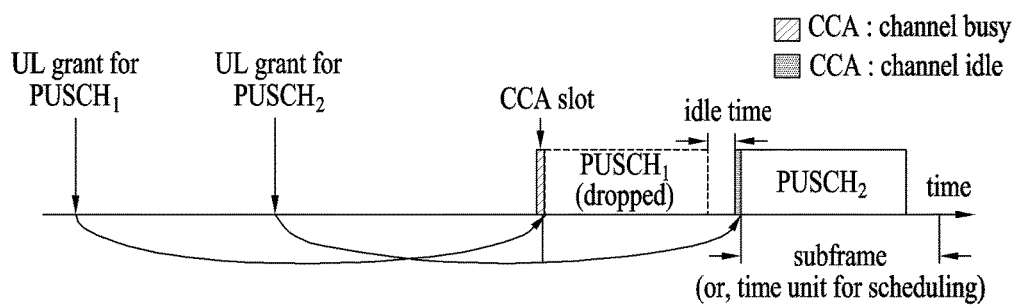
FIG. 7 is a diagram for an example of receiving a UL data transmission indication (UL grant), performing channel sensing according to the UL data transmission indication, and transmitting a UL data.

For example, FIG. 7 illustrates an LBT operation (hereinafter, UL LBT) for performing UL transmission of a user equipment when the user equipment applies FBE scheme as the LBT operation. Referring to FIG. 7, although a user equipment receives a UL grant corresponding to PUSCHI from a base station, since a channel is determined as an occupied state (e.g., CCA: channel busy) according to a CCA result of UL LBT which is performed before UL transmission is performed, transmission is not performed. In particular, in order for a user equipment to perform UL transmission in LAA system, it is necessary for the user equipment to receive a UL grant from a base station and secure a channel using an LBT operation at UL transmission timing indicated by the UL grant. As a result, a problem of lowering a channel occupancy probability according to UL LBT may occur compared to an LBT operation in DL.

Figure 8:
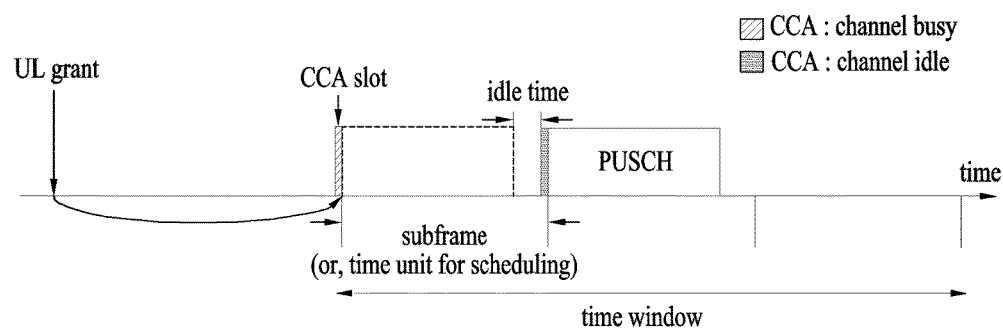
FIG. 8 is a diagram for an example of receiving a UL data transmission indication (UL grant), performing channel sensing according to the UL data transmission indication, and transmitting a UL data, when a plurality of transmission opportunity units (e.g., time window) are configured for a transmitting node.
Figure 8:
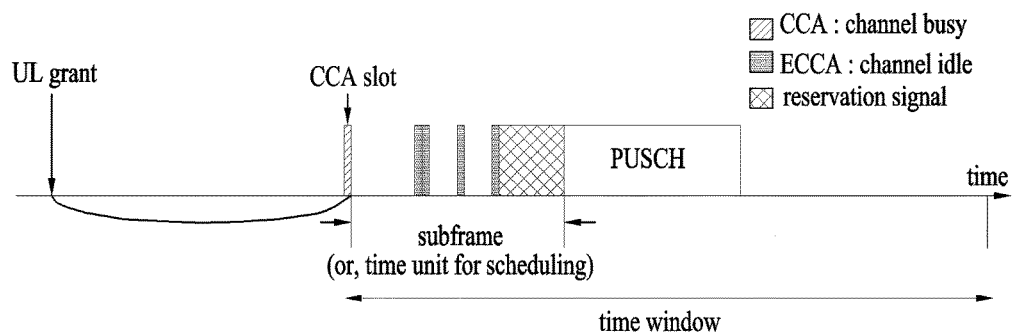

Meanwhile, a method that a base station informs a UE of information on a time window for which UL transmission is permitted to increase a UL transmission success rate in LAA system and the UE performs UL LBT to perform UL transmission in the time window has been proposed. FIGS. 8 (a) and (b) respectively show examples of the method when the UE performs a FBE-based LBT operation and an LBE-based LBT operation.

As mentioned in the foregoing description, if a UL LBT operation and UL transmission are allowed in a prescribed time window, it may have a merit in that a UL transmission success rate is increased. Yet, in the examples of FIGS. 8 (a) and (b), if all or a part of UL transmission time windows of UEs different from each other are overlapped, a collision problem, which is not intended by the base station, may occur between UL transmissions in case of the FBE scheme. In case of the LBE scheme, although a reservation signal is designed to interrupt or cancel UL transmission of a different UE by transmitting the reservation signal, similar to the FBE scheme, a collision problem, which is not intended by the base station, may occur between UL transmissions.

In order to solve the abovementioned problem, when a plurality of transmitting nodes (e.g., UEs) receive a control signal (e.g., UL grant) indicating data transmission from a control node (e.g., base station) and a plurality of the transmitting nodes are able to perform data transmission according to an LBT operation by utilizing at least one transmission unit among a plurality of transmission units promised (with the control node) in advance, the present invention proposes a method for each transmitting node to reduce a data transmission collision between transmitting nodes and increase a transmission success rate by applying a differential LBT operation to each of a plurality of the transmission units. In this case, a plurality of the transmission units capable of transmitting the data can be configured in a form of a specific time window. In the following, although an operation in LTE system is illustrated to explain an operation of the present invention, the operation of the present invention can be extensively applied to a random wireless communication network consisting of nodes performing LBT-based transmission in an unlicensed band.

Method of Performing Differential LBT According to Transmission Unit

When a Transmitting Node is Able to Attempt to Transmit Data in a Plurality of Transmission Units (Based on LBT Operation), a Method of Setting a Priority According to a Transmission Unit (by a Control Node or a Network)

When a transmitting node receives a control signal from a control node and the transmitting node is able to perform data transmission in at least one transmission unit among a plurality of transmission units (preconfigured or promised in advance), if the transmitting node performs an operation of performing transmission in a specific transmission unit among a plurality of the transmission units, the control node may consider the operation as the most preferable operation. For example, a base station may allow a UE to attempt to transmit PUSCH in a time window consisting of M number of SFs after prescribed time is elapsed from the timing at which a UL grant is received to increase a UL data transmission rate in LAA system according to the embodiment of the present invention. In this case, if the UE performs an operation of successfully transmitting PUSCH in a first SF among the M number of SFs, the base station may consider the operation as an intended operation and a preferable operation in the aspect of reducing detection complexity of PUSCH transmission. Hence, when a transmitting node is able to attempt to transmit data in a plurality of transmission units according to a control signal, the present invention proposes a method of setting a priority according to each of a plurality of the transmission units (by a control node or a network). For example, the control node can assign a priority according to transmission timing of a transmission unit among a plurality of the transmission units using one of methods described in the following.

(1) Higher priority is assigned to earlier transmission timing (2) Higher priority is assigned to later transmission timing The control node can inform transmitting nodes of the method of setting the priority via a semi-static signal or a dynamic control signal. If it is assumed that the control node sets a priority to each of a plurality of transmission units via the dynamic control signal, a specific priority value or a specific indication value of the control signal can be used for the usage of not allowing transmission in a corresponding transmission unit. Or, the priority may indicate an order at which each of a plurality of the transmission units is positioned.

In the following, when a plurality of transmitting nodes receive a control signal indicating data transmission from a control node and a plurality of the transmitting nodes are able to perform data transmission according to an LBT operation in a plurality of transmission units promised (with the control node) in advance, a method of performing a differential LBT operation in a time window (for performing the data transmission) is proposed for a case that the LBT operation does not include a back-off operation and a case that the LBT operation includes a back-off operation, respectively.

LBT Operation without Back-Off Operation (e.g., FBE-Like)

When a Transmitting Node is Able to Attempt to Transmit Data (Based on an LBT Operation) in a Plurality of Transmission Units, a CCA Section Consisting of a Plurality of CCA Slots is Set Prior to a Transmission Unit and CCA is Performed in a CCA Slot Among a Plurality of the CCA Slots According to a Priority (or, Number of Transmission Attempts) of the Transmission Unit. In this Case, if a Channel is in an Unoccupied State, Data can be Transmitted in the Transmission Unit.

For example, when the L number of priority levels (e.g., $l_1 > l_2 > \ldots l_L$, as a value is greater, priority is higher) in total exist in each of transmission units and the N number of CCA slots exist prior to each of the transmission units, CCA can be performed by selecting an $k^{th}$ (e.g., k=1, 2, ..., N) CCA slot from among the N number of CCA slots according to at least one of methods described in the following.

(1) If a priority level of a transmission unit corresponds to $l_i$, k=I mod N

In particular, as a priority level is higher, a transmitting node can perform CCA in a preceding CCA slot.

(2) If a priority level of a transmission unit is equal to or greater (or, less) than a specific value, select a specific CCA slot (3) If a priority level of a transmission unit corresponds to a specific value, the transmission unit is not used.

Or, a CCA slot can be selected according to the number of transmission attempts of a transmitting node in a plurality of the transmission units. For example, timing of a CCA slot for a current transmission unit can be configured to be late compared to timing of a CCA slot for a previous transmission unit or vice versa. As an additional operation of the abovementioned operation, if CCA is performed, a channel state is determined as an unoccupied state according to a result of the CCA, and signal transmission is available, the transmitting node can transmit a short reservation signal until the start timing of data transmission (e.g., start timing of a transmission unit).

Figure 9:
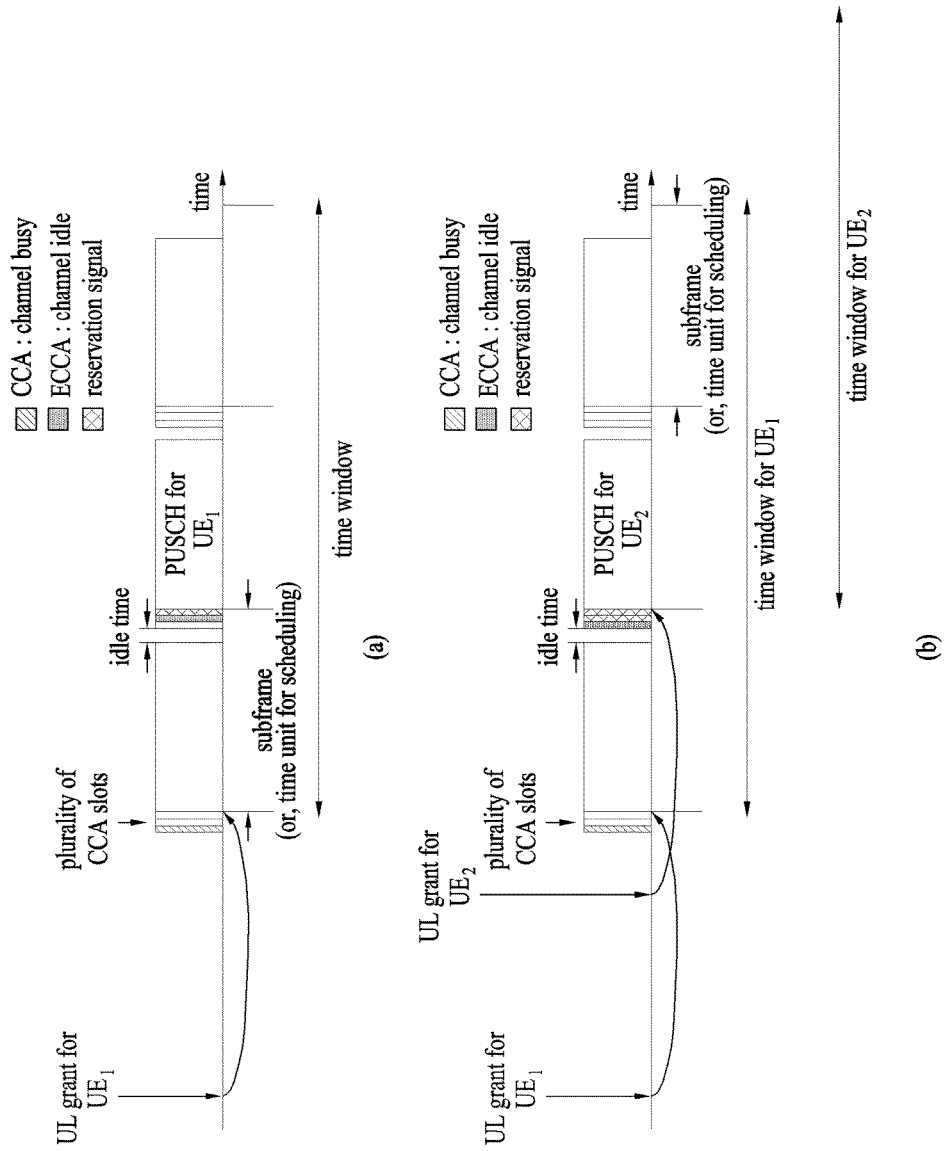
FIG. 9 is a diagram for an example of selecting a CCA slot according to a priority assigned to a plurality of transmission opportunities, performing channel sensing in a selected CCA slot, and transmitting UL data according to one embodiment of the present invention.

FIGS. 9 (a) and (b) illustrate operations of selecting a CCA slot according to a priority of a transmission unit and performing CCA and show a case that a control node allows PUSCH transmission attempt in 3 SFs (i.e., 3 transmission units) for a single UL grant. In this case, it is assumed that a higher priority is set to a preceding transmission unit. Referring to FIG. 9 (a), a UE1 performs CCA in a first CCA slot of a first SF among 3 SFs, a channel state is determined as an occupied state (i.e., channel busy) according to a result of the CCA, and transmission is not performed. The UE1 performs CCA in a second CCA slot of a second SF, a channel state is determined as an unoccupied state (i.e., channel idle) according to a result of the CCA, and a reservation signal and data are transmitted. FIG. 9 (b) illustrates an example that a UE2 succeeds in transmitting (a reservation signal and) data based on a CCA operation performed in a first CCA slot of a first SF among 3 SFs set to the UE2. Referring to FIG. 9 (b), the UE2 succeeds in performing an LBT operation in the first SF among 3 SFs set to the UE2. On the contrary, in case of the UE1, since a CCA result corresponds to a channel occupied state in the first SF and a CCA result also corresponds to a channel occupied state in the second SF due to a reservation signal transmitted by the UE2 (since CCA is performed in the second CCA slot), the UE1 does not transmit data. As a result, a transmission collision does not occur between the UE1 and the UE2.

In addition to the operations of selecting a CCA slot according to a priority assigned to a transmission unit and performing CCA, a control unit can directly inform a transmitting node of a CCA slot position to be applied by the transmitting node via a control signal. For example, a control signal may indicate CCA slot positions for a plurality of transmission units. If there is a control signal in response to each of a plurality of the transmission units, the control signal can indicate a CCA slot position of a corresponding transmission unit. And, additional defer time can be set among a plurality of the CCA slots.

LBT Operation Including Back-Off Operation (e.g., LBE-Like)

When a Transmitting Node is Able to Attempt to Transmit Data (Based on an LBT Operation) in a Plurality of Transmission Units, a Section (Capable of Performing Initial CCA, ECCA, Back-Off, Defer Time, Transmission of a Reservation Signal, Etc.) in which LBT is Performed is Set Prior to Each Transmission Unit and a Length of the Section in which LBT is Performed can be Adjusted According to a Priority (or Number of Transmission Attempts) of a Corresponding Transmission Unit.

For example, when the L number of priority levels (e.g., $l_1 > l_2 > \ldots l_L$, as a value is greater, priority is higher) in total exist in each of transmission units and a section in which LBT is performed as much as TLBT exists prior to each transmission unit, if a priority level corresponds to $l_i$, in a specific transmission unit, a length of the TLBT can be represented by a function (e.g., $TLBT=F(l_i)$) of the priority level $l_i$. Or, the TLBT length can be controlled according to the number of transmission attempts of a transmitting node in a plurality of the transmission units. For example, a TLBT length for a current transmission unit can be configured to have a value greater than a TLBT length for a previous transmission unit. Or, the TLBT length for the current transmission unit can be configured to have a value smaller than the TLBT length for the previous transmission unit.

Figure 10:
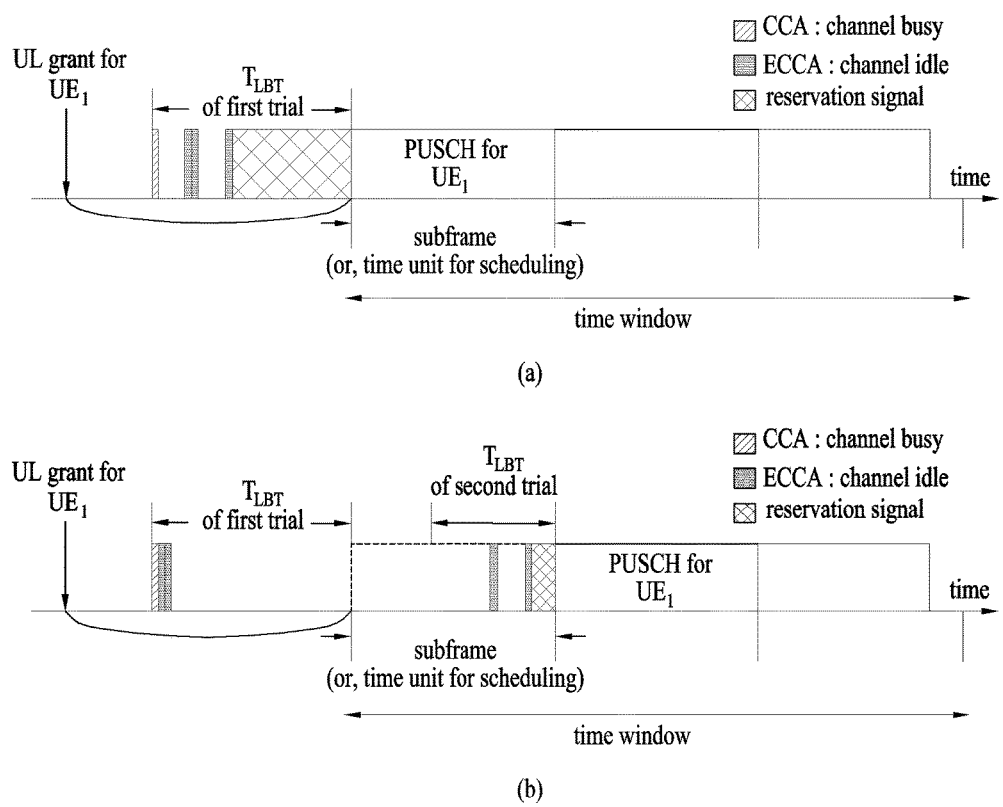
FIG. 10 is a diagram for an example of adjusting a length of an LBT section according to a priority assigned to a plurality of transmission opportunities, performing channel sensing in the LBT section, and transmitting UL data according to one embodiment of the present invention.

FIG. 10 is a diagram for an example of adjusting a length of an LBT section according to a priority of a transmission unit. FIG. 10 shows a case that a control node allows a PUSCH transmission attempt in 3 SFs for a single UL grant. And, a method of adjusting a TLBT value according to the number of transmission attempts is considered.

When a UE1 attempts to perform transmission in a first SF among 3 SFs, FIG. 10 (a) shows an example that the UE1 succeeds in performing transmission by performing an LBT operation such as initial CCA, ECCA, and the like at the timing prior to TLBT from a boundary of the first SF. On the contrary, FIG. 10 (b) shows an example that the UE1 fails to perform transmission in the first SF among 3 SFs and performs an LBT operation for performing transmission in a second SF. In this case, a length of TLBT for performing transmission in the second SF is configured to be shorter than a length of TLBT for performing transmission in the first SF. This is because, if the UE1, which has already exhausted a part of a back-off counter, performs an LBT operation for performing transmission in the second SF while the TLBT length is maintained, the UE1 may excessively occupy a channel compared to other UEs that perform first transmission attempt in the second SF.

When a Transmitting Node is Able to Attempt to Transmit Data (Based on an LBT Operation) in a Plurality of Transmission Units, a Value of the Back-Off Counter can be Changed According to a Priority (or, Number of Transmission Attempt) of a Specific Transmission Unit.

For example, when the L number of priority levels (e.g., $l_1 > l_2 > \ldots l_L$, as a value is greater, priority is higher) in total exist in each of transmission units and an LBT operation is performed to perform transmission in a specific transmission unit, it may consider a method of adding a prescribed value, which is given as a function of a priority level of the transmission unit, to a current back-off counter value. And, if it reaches a specific priority level, a value of a back-off counter can be initialized by a predetermined fixed value.

As an additional operation of a method of changing a length of a section in which LBT is performed or a value of a back-off counter according to a priority of a transmission unit, a control node may directly inform a transmitting node of a length of a section in which LBT is performed and a change of a back-off counter via a control signal. For example, the control node may inform the transmitting node of a length of a section in which LBT is performed on a plurality of transmission units or offset values for a back-off counter via a control signal. Or, if a corresponding control signal exists in every transmission unit, the control node may inform the transmitting node of a length of a section in which LBT is performed on the transmission unit or an offset value for the back-off counter.

Method of Reducing BD (Blind Detection) Complexity of Reception Node

As mentioned earlier in the background of the present invention, when a transmitting node receives a control signal indicating data transmission from a control node and attempts to perform the data transmission corresponding to the control signal in a plurality of transmission units, it is necessary for a reception node to perform BD to determine a transmission unit in which the transmitting node actually performs the data transmission. As mentioned in the foregoing description, an operation of attempting to detect data in a plurality of transmission units may require high complexity in the aspect of the reception node. Hence, a method of reducing BD complexity of the reception node is proposed in the present paragraph.

When a Transmitting Node is Able to Attempt to Transmit Data (Based on an LBT Operation) in a Plurality of Transmission Units, Information on a Transmission Unit in which a Reservation Signal is Transmitted According to an LBT Operation Among a Plurality of the Transmission Units can be Generated and Transmitted by Reflecting the Information to a Sequence of the Reservation Signal.

As a method of reducing the BD complexity of the reception node, when a transmitting node transmits a reservation signal based on an LBT operation, it may consider a method of including information on an order of a transmission unit, which has succeeded in performing transmission at the time of generating a sequence of the reservation signal, among a plurality of transmission units configured for performing data transmission. In this case, if the reception node performs detection on the reservation signal, the reception node is able to know the number of transmission attempts performed by a currently transmitted data. As a result, it may be able to induce scheduling timing of the data transmission from the number of transmission attempts. More specifically, assume that a base station allows a UE to attempt to transmit PUSCH in 4 SFs in total ranging from an $(n+4)^{th}$ SF to an $(n+7)^{th}$ SF in an $n^{th}$ SF in LTE system. If the UE succeeds in transmitting PUSCH in an $(n+5)^{th}$ SF, the UE can generate and transmit a reservation signal in a manner of reflecting the success of transmission in a second SF among the 4 SFs set to the UE to the reservation signal, which is transmitted prior to the PUSCH transmission. Then, the base station can induce information indicating that the UE has obtained a first transmission opportunity in the $(n+4)^{th}$ SF and the UE has received a UL grant in the $n^{th}$ SF from the reservation signal. Subsequently, it may be able to reduce BD targets based on information on the PUSCH, which is scheduled in the $n^{th}$ SF.

As an additional operation, when a transmitting node transmits a DM-RS (demodulation reference signal), information on an order of a current transmission unit among a plurality of transmission units to which data transmission attempt is permitted can be transmitted in a manner of being reflected to the generation of a sequence of the DM-RS.

When a Transmitting Node Performs LBT-Based Signal Transmission and a Control Node Allows the Maximum M Number of Retransmission (for SINR Combining) Via a HARQ Procedure, the Control Node does not Reflect the Number of Retransmission Due to the LBT Failure of the Transmitting Node to the M Number of Retransmission for the HARQ Procedure.

LTE system can retransmit data transmission which is determined as NACK via a HARQ procedure. In this case, a control node can determine the maximum number of the retransmission to enable a reception node to obtain a gain in the aspect of SINR by combining a plurality of retransmitted reception signals (e.g., SINR combining). Yet, as mentioned earlier in the background of the present invention, when transmitting nodes perform LBT-based data transmission, if a transmitting node fails to perform data transmission because a channel is in an occupied state according to a CCA result in accordance with an LBT process, the control node can also indicate retransmission. If the retransmission is reflected to the number of retransmission of the HARQ procedure, although the reception node completely exhausts the maximum number of retransmission, the reception node may have the less number of opportunities for receiving a data signal. Hence, preferably, in order to support a SINR combining operation, it may consider an operation of counting the retransmission number on the basis of the number of actually performed data transmission. Meanwhile, the control node may receive a feedback indicating whether or not DTX is performed due to an LBT failure from the transmitting node. If the control node corresponds to a reception node, the control node can autonomously detect whether or not DTX is performed due to an LBT failure.

Figure 11:
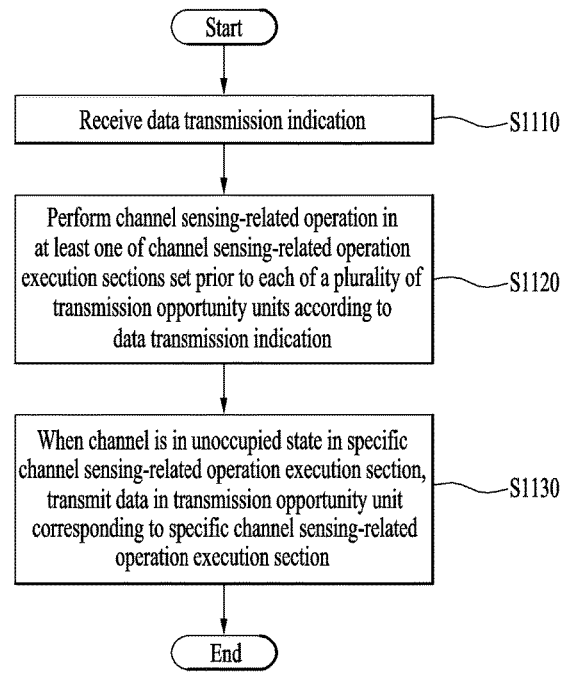
FIG. 11 is a flowchart for an operation according to an embodiment of the present invention.

FIG. 11 is a flowchart for an operation according to an embodiment of the present invention. FIG. 11 shows a method of performing channel sensing in an unlicensed band in a wireless communication system. The method may be performed by a transmitting node transmitting data by performing the channel sensing.

The transmitting node may receive a data transmission indication from a control node [S1110]. The transmitting node may perform a channel sensing-related operation in at least one of channel sensing-related operation execution sections set prior to each of a plurality of transmission opportunity units allowed to the transmitting node according to the data transmission indication [S1120]. When a state of a channel on which the data is to be transmitted is determined as an unoccupied state in a specific channel sensing-related operation execution section, the transmitting node may perform data transmission according to the data transmission indication in a transmission opportunity unit corresponding to the specific channel sensing-related operation execution section [S1130]. A transmission priority may be assigned to each of the plurality of the transmission opportunity units and the channel sensing-related operation execution sections set prior to each of the plurality of the transmission opportunity units may have a length being adjusted according to the transmission priority assigned to each of the plurality of the transmission opportunity units.

And, a length of a channel sensing-related operation execution section of a preceding transmission opportunity unit among the plurality of the transmission opportunity units may be longer than a length of a channel sensing-related operation execution section of a following transmission opportunity unit.

When a channel sensing-related operation is performed in the channel sensing-related operation execution sections set prior to each of a plurality of transmission opportunity units, it may include an operation of adding an offset, which is determined according to a priority of a corresponding transmission opportunity unit, to a value of a back-off counter for the transmitting node. When the priority of the transmission opportunity unit corresponds to a predetermined value, the transmitting node may initialize the value of the back-off counter for the transmitting node with a predetermined value.

The channel sensing-related operation may include at least one of an operation of performing back-off counter-based initial clear channel assessment (CCA), an operation of performing back-off counter-based extended CCA (ECCA), an operation of deferring transmission, or an operation of transmitting a reservation signal.

When a back-off counter value becomes 0 in the channel sensing-related operation execution sections set prior to one of the plurality of the transmission opportunity units, the transmitting node may transmit a reservation signal. The reservation signal may include information indicating a transmission opportunity unit among the plurality of the transmission opportunity units and that the reservation signal may be for a data transmission for the indicated transmission opportunity unit.

In the foregoing description, embodiments of the present invention have been briefly explained with reference to FIG. 11. An embodiment related to FIG. 11 can alternatively or additionally include at least a part of the aforementioned embodiments.

Figure 12:
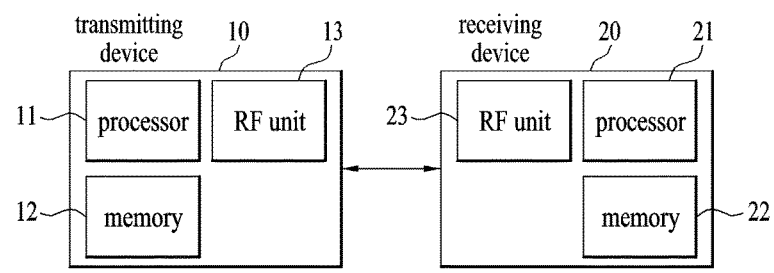
FIG. 12 is a block diagram of a device for implementing embodiment(s) of the present invention.

FIG. 12 is a block diagram illustrating a transmitter 10 and a receiver 20 configured to implement embodiments of the present invention. Each of the transmitter 10 and receiver 20 includes a radio frequency (RF) unit 13, 23 capable of transmitting or receiving a radio signal that carries information and/or data, a signal, a message, etc., a memory 12, 22 configured to store various kinds of information related to communication with a wireless communication system, and a processor 11, 21 operatively connected to elements such as the RF unit 13, 23 and the memory 12, 22 to control the memory 12, 22 and/or the RF unit 13, 23 to allow the device to implement at least one of the embodiments of the present invention described above.

The memory 12, 22 may store a program for processing and controlling the processor 11, 21, and temporarily store input/output information. The memory 12, 22 may also be utilized as a buffer. The processor 11, 21 controls overall operations of various modules in the transmitter or the receiver. Particularly, the processor 11, 21 may perform various control functions for implementation of the present invention. The processors 11 and 21 may be referred to as controllers, microcontrollers, microprocessors, microcomputers, or the like. The processors 11 and 21 may be achieved by hardware, firmware, software, or a combination thereof. In a hardware configuration for an embodiment of the present invention, the processor 11, 21 may be provided with application specific integrated circuits (ASICs) or digital signal processors (DSPs), digital signal processing devices (DSPDs), programmable logic devices (PLDs), and field programmable gate arrays (FPGAs) that are configured to implement the present invention. In the case which the present invention is implemented using firmware or software, the firmware or software may be provided with a module, a procedure, a function, or the like which performs the functions or operations of the present invention. The firmware or software configured to implement the present invention may be provided in the processor 11, 21 or stored in the memory 12, 22 to be driven by the processor 11, 21.

The processor 11 of the transmitter 10 performs predetermined coding and modulation of a signal and/or data scheduled by the processor 11 or a scheduler connected to the processor 11, and then transmits a signal and/or data to the RF unit 13. For example, the processor 11 converts a data sequence to be transmitted into K layers through demultiplexing and channel coding, scrambling, and modulation. The coded data sequence is referred to as a codeword, and is equivalent to a transport block which is a data block provided by the MAC layer. One transport block is coded as one codeword, and each codeword is transmitted to the receiver in the form of one or more layers. To perform frequency-up transformation, the RF unit 13 may include an oscillator. The RF unit 13 may include Nt transmit antennas (wherein Nt is a positive integer greater than or equal to 1).

The signal processing procedure in the receiver 20 is configured as a reverse procedure of the signal processing procedure in the transmitter 10. The RF unit 23 of the receiver 20 receives a radio signal transmitted from the transmitter 10 under control of the processor 21. The RF unit 23 may include Nr receive antennas, and retrieves baseband signals by frequency down-converting the signals received through the receive antennas. The RF unit 23 may include an oscillator to perform frequency down-converting. The processor 21 may perform decoding and demodulation on the radio signal received through the receive antennas, thereby retrieving data that the transmitter 10 has originally intended to transmit.

The RF unit 13, 23 includes one or more antennas. According to an embodiment of the present invention, the antennas function to transmit signals processed by the RF unit 13, 23 are to receive radio signals and deliver the same to the RF unit 13, 23. The antennas are also called antenna ports. Each antenna may correspond to one physical antenna or be configured by a combination of two or more physical antenna elements. A signal transmitted through each antenna cannot be decomposed by the receiver 20 anymore. A reference signal (RS) transmitted in accordance with a corresponding antenna defines an antenna from the perspective of the receiver 20, enables the receiver 20 to perform channel estimation on the antenna irrespective of whether the channel is a single radio channel from one physical antenna or a composite channel from a plurality of physical antenna elements including the antenna. That is, an antenna is defined such that a channel for delivering a symbol on the antenna is derived from a channel for delivering another symbol on the same antenna. An RF unit supporting the Multiple-Input Multiple-Output (MIMO) for transmitting and receiving data using a plurality of antennas may be connected to two or more antennas.

In embodiments of the present invention, the UE operates as the transmitter 10 on uplink, and operates as the receiver 20 on downlink. In embodiments of the present invention, the eNB operates as the receiver 20 on uplink, and operates as the transmitter 10 on downlink.

The transmitter and/or receiver may be implemented by one or more embodiments of the present invention among the embodiments described above.

Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention defined in the appended claims. Thus, the present invention is not intended to be limited to the embodiments described herein, but is intended to have the widest scope consistent with the principles and novel features disclosed herein.

INDUSTRIAL APPLICABILITY

The present invention is applicable to wireless communication devices such as a terminal, a relay, and a base station.

What is claimed is:

1. A method for a transmitting node to operate in an unlicensed band in a wireless communication system, the method comprising:

receiving a data transmission indication from a control node;

performing a channel sensing-related operation using a back-off counter value in at least one of channel sensing-related operation execution sections set prior to each of a plurality of transmission opportunity units allowed to the transmitting node according to the data transmission indication; and performing a data transmission according to the data transmission indication in a transmission opportunity unit determined based on the back-off counter value, wherein a transmission priority is assigned to each of the plurality of the transmission opportunity units, wherein an offset, determined according to the transmission priority of a corresponding transmission opportunity unit, is added to the back-off counter value, and wherein the at least one of the channel sensing-related operation execution sections set prior to each of the plurality of transmission opportunity units has a length being adjusted according to the transmission priority assigned to each of the plurality of the transmission opportunity units.

2. The method of claim 1, wherein a length of a channel sensing-related operation execution section of a preceding transmission opportunity unit among the plurality of the transmission opportunity units is longer than a length of a channel sensing-related operation execution section of a following transmission opportunity unit.

3. The method of claim 1, further comprising initializing the value of the back-off counter for the transmitting node with a predetermined value when the priority of the transmission opportunity unit corresponds to a predetermined value.

4. The method of claim 1, wherein the channel sensing-related operation comprises at least one of an operation of performing back-off counter-based initial clear channel assessment (CCA), an operation of performing back-off counter-based extended CCA (ECCA), an operation of deferring transmission, or an operation of transmitting a reservation signal.

5. The method of claim 1, further comprising transmitting a reservation signal when a back-off counter value becomes 0 in a channel sensing-related operation execution section set prior to one of the plurality of the transmission opportunity units, wherein the reservation signal comprises information indicating a transmission opportunity unit among the plurality of the transmission opportunity units and that the reservation signal is for a data transmission for the indicated transmission opportunity unit.

6. A transmitting node configured to operate in an unlicensed band in a wireless communication system, the transmitting node comprising:

a transceiver; and a processor configured to:

control the transceiver to receive a data transmission indication from a control node, perform a channel sensing-related operation using a back-off counter value in at least one of channel sensing-related operation execution sections set prior to each of a plurality of transmission opportunity units allowed to the transmitting node according to the data transmission indication, and perform a data transmission according to the data transmission indication in a transmission opportunity unit determined based on the back-off counter value, wherein a transmission priority is assigned to each of the plurality of the transmission opportunity units, wherein an offset, determined according to the transmission priority of a corresponding transmission opportunity unit, is added to the back-off counter value, and wherein the at least one of the channel sensing-related operation execution sections set prior to each of the plurality of transmission opportunity units has a length being adjusted according to the transmission priority assigned to each of the plurality of the transmission opportunity units.

7. The transmitting node of claim 6, wherein a length of a channel sensing-related operation execution section of a preceding transmission opportunity unit among the plurality of the transmission opportunity units is longer than a length of a channel sensing-related operation execution section of a following transmission opportunity unit.

8. The transmitting node of claim 6, wherein the processor initializes the value of the back-off counter for the transmitting node with a predetermined value when the priority of the transmission opportunity unit corresponds to a predetermined value.

9. The transmitting node of claim 6, wherein the channel sensing-related operation comprises at least one of an operation of performing back-off counter-based initial clear channel assessment (CCA), an operation of performing back-off counter-based extended CCA (ECCA), or operation of deferring transmission, and an operation of transmitting a reservation signal.

10. The transmitting node of claim 6, wherein the processor controls the transceiver to transmit a reservation signal when a back-off counter value becomes 0 in a channel sensing-related operation execution section set prior to one of the plurality of the transmission opportunity units, and wherein the reservation signal comprises information indicating a transmission opportunity unit among the plurality of the transmission opportunity units and that the reservation signal is for a data transmission for the indicated transmission opportunity unit.

* * * * *